United States Patent
Narusawa

(10) Patent No.: US 8,280,271 B2
(45) Date of Patent: Oct. 2, 2012

(54) PRINTING SYSTEM AND ORDER-SHEET-BASED BATCH PRINTING METHOD

(75) Inventor: Hideyuki Narusawa, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 1078 days.

(21) Appl. No.: 12/148,921

(22) Filed: Apr. 23, 2008

(65) Prior Publication Data

US 2008/0266535 A1 Oct. 30, 2008

(30) Foreign Application Priority Data

Apr. 24, 2007 (JP) ................................. 2007-113830
Jan. 28, 2008 (JP) ................................. 2008-015877

(51) Int. Cl.
*G03G 15/00* (2006.01)
(52) U.S. Cl. ........... 399/84; 399/367; 358/444; 358/1.9; 358/1.18
(58) Field of Classification Search .................. 399/84, 399/367; 358/444, 1.9, 1.18
See application file for complete search history.

(56) References Cited

U.S. PATENT DOCUMENTS

| | | | |
|---|---|---|---|
| 6,157,459 A | 12/2000 | Shiota et al. | |
| 6,466,336 B1 * | 10/2002 | Sturgeon et al. | 358/444 |
| 6,795,206 B1 | 9/2004 | Shiota et al. | |
| 2001/0019416 A1 * | 9/2001 | Monty et al. | 358/1.9 |
| 2005/0264832 A1 * | 12/2005 | Baum et al. | 358/1.2 |

FOREIGN PATENT DOCUMENTS

| | | |
|---|---|---|
| JP | 10-239780 A | 9/1998 |
| JP | 2002-137499 A | 5/2002 |
| JP | 2005-117328 | 4/2005 |
| JP | 2005117328 A | 4/2005 |
| JP | 2005-221809 | 8/2005 |
| JP | 2006-203528 | 8/2006 |
| JP | 2006-285495 A | 10/2006 |

* cited by examiner

*Primary Examiner* — Walter L Lindsay, Jr.
*Assistant Examiner* — Roy Y Yi
(74) *Attorney, Agent, or Firm* — Nutter McClennen & Fish LLP; John J. Penny, Jr.; Christina M. Sperry

(57) ABSTRACT

A printing system includes an optical sensor that reads a plurality of order sheets at least selecting images to be printed and printing sheet types, a printing specifying unit that specifies the images and printing sheet types selected by the order sheets on the basis of an output from the optical sensor, a reader that reads image data of the images selected by the order sheets from a recording medium, and a printer that prints the read image data on types of printing paper which correspond to the printing sheet types selected by the order sheets, wherein after the optical sensor reads the order sheets, the printer performs batch printing based on the images and printing sheet types selected by all the order sheets.

13 Claims, 6 Drawing Sheets

FIG. 4

| SHEET #1 (L) | 1ST FRAME: 2 COPIES | WITHOUT BORDERS | DATE INSERTED |
|---|---|---|---|
| SHEET #2 (L) | 2ND FRAME: 1 COPY | WITH BORDERS | DATE INSERTED |
| SHEET #3 (A4) | 4TH FRAME: 3 COPIES | WITH BORDERS | NO DATE INSERTED |
| SHEET #4 (L) | 1ST FRAME: 3 COPIES | WITHOUT BORDERS | DATE INSERTED |
| | 2ND FRAME: 1 COPY | | |
| | 3RD FRAME: 1 COPY | | |
| | 4TH FRAME: 1 COPY | | |
| | 5TH FRAME 1 COPY | | |
| SHEET #5 (2L) | 1ST FRAME: 1 COPY | WITH BORDERS | DATE INSERTED |
| | 2ND FRAME: 2 COPIES | | |
| | 4TH FRAME: 2 COPIES | | |

FIG. 5

| JOB J1 | PAPER SIZE: L | 1ST FRAME: 5 COPIES | WITHOUT BORDERS | DATE INSERTED |
|---|---|---|---|---|
| | | 2ND FRAME: 1 COPY | WITH BORDERS | DATE INSERTED |
| | | 2ND FRAME: 1 COPY | WITHOUT BORDERS | DATE INSERTED |
| | | 3RD FRAME: 1 COPY | WITHOUT BORDERS | DATE INSERTED |
| | | 4TH FRAME: 1 COPY | WITHOUT BORDERS | DATE INSERTED |
| | | 5TH FRAME 1 COPY | WITHOUT BORDERS | DATE INSERTED |
| JOB J2 | PAPER SIZE: A4 | 4TH FRAME: 3 COPIES | WITH BORDERS | NO DATE INSERTED |
| JOB J3 | PAPER SIZE: 2L | 1ST FRAME: 1 COPY | WITH BORDERS | DATE INSERTED |
| | | 2ND FRAME: 2 COPIES | WITH BORDERS | DATE INSERTED |
| | | 4TH FRAME: 2 COPIES | WITH BORDERS | DATE INSERTED |

FIG. 8

| JOB J1 | PAPER SIZE: L | 1ST FRAME: 5 COPIES | WITHOUT BORDERS | DATE INSERTED |
|---|---|---|---|---|
| | | 2ND FRAME: 1 COPY | WITH BORDERS | DATE INSERTED |
| | | 2ND FRAME: 1 COPY | WITHOUT BORDERS | DATE INSERTED |
| | | 3RD FRAME: 1 COPY | WITHOUT BORDERS | DATE INSERTED |
| | | 4TH FRAME: 1 COPY | WITHOUT BORDERS | DATE INSERTED |
| | | 5TH FRAME 1 COPY | WITHOUT BORDERS | DATE INSERTED |
| JOB J2 | PAPER SIZE: A4 | 4TH FRAME: 3 COPIES | WITH BORDERS | NO DATE INSERTED |
| | | N-UP: 1ST TO 6TH FRAMES | WITH BORDERS | NO DATE INSERTED |
| JOB J3 | PAPER SIZE: 2L | 1ST FRAME: 1 COPY | WITH BORDERS | DATE INSERTED |
| | | 2ND FRAME: 2 COPIES | WITH BORDERS | DATE INSERTED |
| | | 4TH FRAME: 2 COPIES | WITH BORDERS | DATE INSERTED |

PRINTING SYSTEM AND ORDER-SHEET-BASED BATCH PRINTING METHOD

BACKGROUND

1. Technical Field

The present invention relates to a printing system and an order-sheet-based batch printing method.

2. Related Art

In recent years, multifunction machines in which a printing function and a scanner function are integrated have been widely used. The multifunction machines can be used as printers, scanners, and copiers. In addition, the multifunction machines can perform direct printing of image data stored in a medium such as a memory card or a compact-disc read-only memory (CD-ROM) without using a host apparatus such as a personal computer. Methods for such direct printing include a method using an order sheet.

The order sheet has a list in index form of reduced images of the image data stored in the medium, and is also used as a mark sheet. In other words, by recording necessary information in the vicinity of each reduced image (that is, by blacking out a necessary portion in a mark area), images to be printed and the number of copies to be printed can be selected. In addition, the order sheet bears printed patterns (check codes) for establishing correspondence with the image data stored in the medium. Accordingly, by setting the order sheet in a multifunction machine, the multifunction machine can use its scanner function to read information of the order sheet, can select corresponding image data items from the medium, and can use its copying function to print desired images (see, for example, JP-A-2005-117328, claims and an abstract).

However, the multifunction machine of the related art cannot collectively read a plurality of order sheets, and cannot print images on the basis of read information. In other words, the multifunction machine of the related art has a problem in that it must print images corresponding to pieces of information of order sheets while repeating a manual operation in which, with the multifunction machine, the first order sheet is read and images corresponding to information of the read order sheet are printed and in which the following order sheet is read and images corresponding to information of the read order sheet are printed.

Accordingly, in a case where, after order sheets are distributed to a plurality of users and each user is allowed to select necessary images, the order sheets are collected and images are printed on the basis of the collected order sheets, it is cumbersome to repeat the manual operation in units of order sheets, as described above. In addition, it is assumed that different types (such as a size) of printing paper are selected in units of order sheets. In such a case, it is cumbersome to change the types of printing paper in units of order sheets.

SUMMARY

An advantage of some aspects of the invention is that the invention provides a printing system for consecutively reading information of a plurality of order sheets and printing images selected by the order sheets, and a batch printing method based on the order sheets.

A printing system according to a first aspect of the invention includes an optical sensor that reads a plurality of order sheets at least selecting images to be printed and printing sheet types, a printing specifying unit that specifies the images and printing sheet types selected by the order sheets on the basis of an output from the optical sensor, a reader that reads image data of the images selected by the order sheets from a recording medium, and a printer that prints the read image data on types of printing paper which correspond to the printing sheet types selected by the order sheets. After the optical sensor reads the order sheets, the printer performs batch printing based on the images and printing sheet types selected by all the order sheets. This enables consecutive reading of pieces of information of a plurality of order sheets and printing of images selected by the order sheets on the basis of the pieces of information.

In a case where the images selected by the order sheets include identical images to be printed, the printer may consecutively print the identical images. This can minimize the number of times image data of the identical images is read from the recording medium.

In a case where the images selected by the order sheets include images to be printed on the same type of printing paper, the printer may consecutively print the images on the same type of printing paper. This can prevent types of the printing paper from being frequently changed.

The printing system may further include a display unit that displays information representing a type of printing paper when the printer initiates consecutive printing. This makes it possible to know a type of printing paper to be printed in the next time. Thus, an appropriate type of printing paper can be set without fail.

The printing system may further include a feeder that feeds the order sheets. The feeder sequentially may feed the order sheets to the optical sensor. This makes it possible to easily read the order sheets.

In addition, an order-sheet-based batch printing method according to a second aspect of the invention includes: reading a plurality of order sheets at least selecting images to be printed and printing sheet types by an optical sensor; specifying the images and printing sheet types selected by the order sheets on the basis of an output from the optical sensor; reading image data of the images selected by the order sheets from a recording medium; and, on the basis of the read image data, performing batch printing based on the images and printing sheet types selected by all the read order sheets. This enables consecutive reading of pieces of information of the order sheet and printing of the images selected by the order sheets on the basis of the pieces of information.

In the order-sheet-based batch printing method, in a case where the images selected by the order sheets include identical images to be printed, the performing batch printing may include consecutive printing of the identical images. This minimizes the number of times image data of the identical images is read from the recording medium.

BRIEF DESCRIPTION OF THE DRAWINGS

The invention will be described with reference to the accompanying drawings, wherein like numbers reference like elements.

FIG. 4 is an illustration of information read for each order sheet.

FIG. 5 is an illustration of an example of classification of the information shown in FIG. 4 in units of jobs.

FIG. 8 is an illustration of an example of the information shown in FIG. 5.

DESCRIPTION OF EXEMPLARY EMBODIMENTS

A digital multifunction machine according to an embodiment of the invention will be described with reference to the accompanying drawings. In the following description, a printing system according to an embodiment of the invention is described by using the digital multifunction machine as an example, and a batch printing method according to an embodiment of the invention is described as operations of the digital multifunction machine. In addition, in the following description, the invention will be described in the order of "A. Configuration Example of Embodiment", "B. Overview of Operation of Embodiment", "C. Details of Operation of Embodiment, and "D. Modifications".

A. Configuration Example of Embodiment

Figure 1:
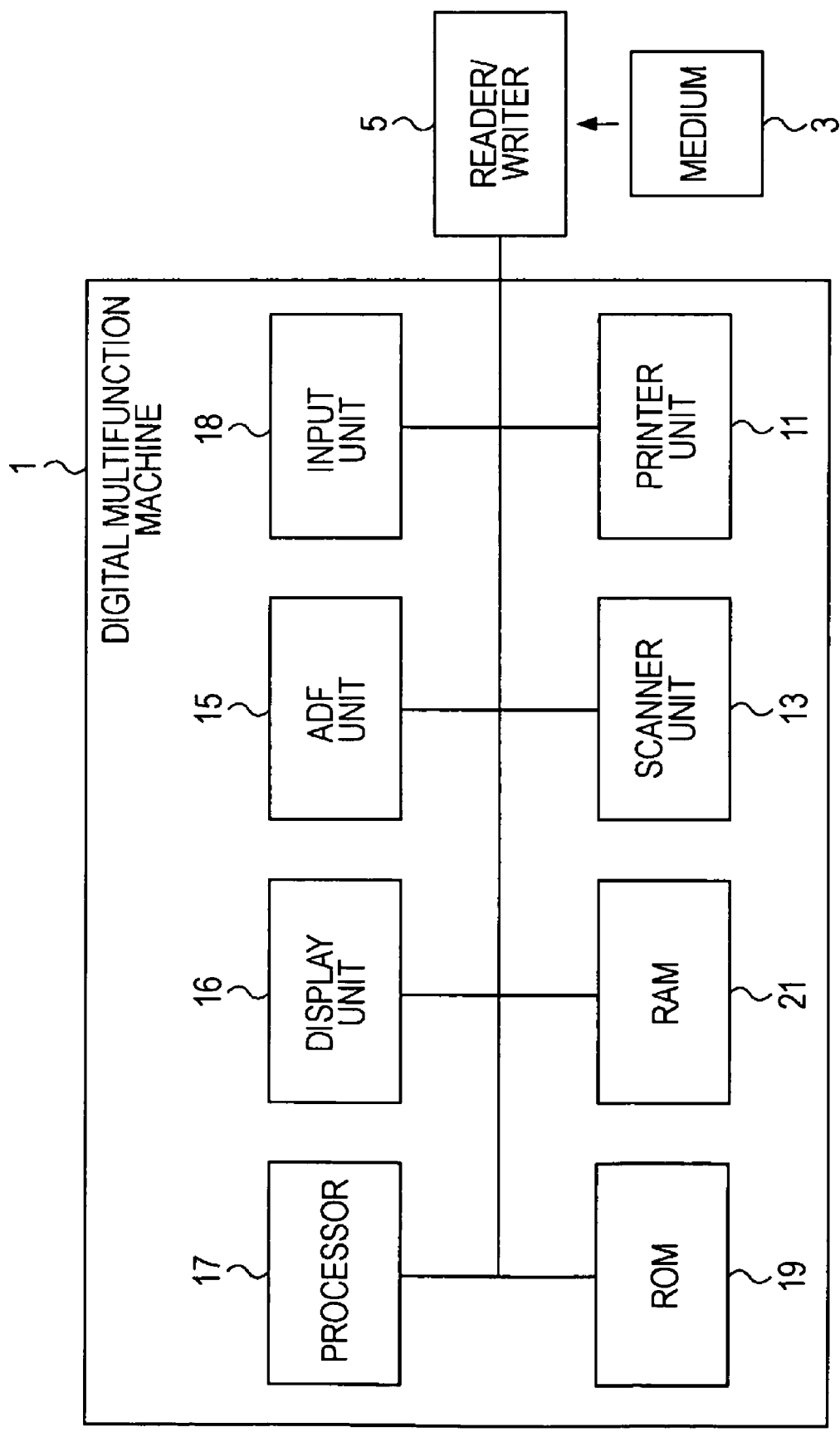
FIG. 1 is a block diagram showing the configuration a digital multifunction machine to which the invention is applied and a peripheral device therefor.

FIG. 1 is a block diagram showing the configuration of a digital multifunction machine 1 according to the embodiment and a peripheral device.

As shown in FIG. 1, the digital multifunction machine 1 is connected to a reader/writer 5 into which a medium 3, such as a memory card, a CD-ROM, or a digital versatile disc ROM (DVD-ROM) is inserted, and which reads/writes information in the medium 3.

The digital multifunction machine 1 includes a printer unit 11 which reads information stored in the medium 3 and creates an order sheet, and which prints an image on the basis of information recorded on an order sheet, a scanner unit 13 that reads information recorded on an order sheet, an auto document feeder (ADF) unit 15 that sequentially feeds a plurality of order sheets to the scanner unit 13, a display unit 16 which displays various types of information and which is formed of a liquid crystal display (LCD) or the like, a processor 17 which controls the printer unit 11 and the scanner unit 13, and which combines order sheets, an input unit 18 that includes an input button and a touch panel, a ROM 19, and a random access memory (RAM) 21 that temporarily stores information.

The printer unit 11 corresponds to a printer. The printer unit 11 prints one or more images on printing paper on the basis of image data stored in the medium 3.

The scanner unit 13 corresponds to an optical sensor. The scanner unit 13 performs conversion to image data by emitting light onto a subject copy and using a photoreceiver (not shown) to convert reflected light into an electric signal. When an order sheet is captured, the scanner unit 13 converts information printed and written on the order sheet into corresponding image data and outputs the image data.

The ADF unit 15 corresponds to a feeder. After a plurality of order sheets are set in the ADF unit 15, the ADF unit 15 automatically feeds the order sheets in a consecutive manner, thus enabling the scanner unit 13 to scan the order sheets in a consecutive manner.

The display unit 16 corresponds to a display unit. The display unit 16 is formed of an LCD or the like, and displays various types of information (such as an image to be printed and setting information) supplied from the processor 17.

The processor 17 corresponds to a printing specifying unit. The processor 17 controls the printer unit 11, the scanner unit 13, the ADF unit 15, and the display unit 16 by executing a program stored in the ROM 19. In addition, as described later, the processor 17 performs processing, such as analyzing, on information recorded on the order sheet read by the scanner unit 13.

The input unit 18 includes, for example, an input button and/or a touch panel or the like. The input unit 18 generates and outputs information based on a user's operation.

Figure 2:
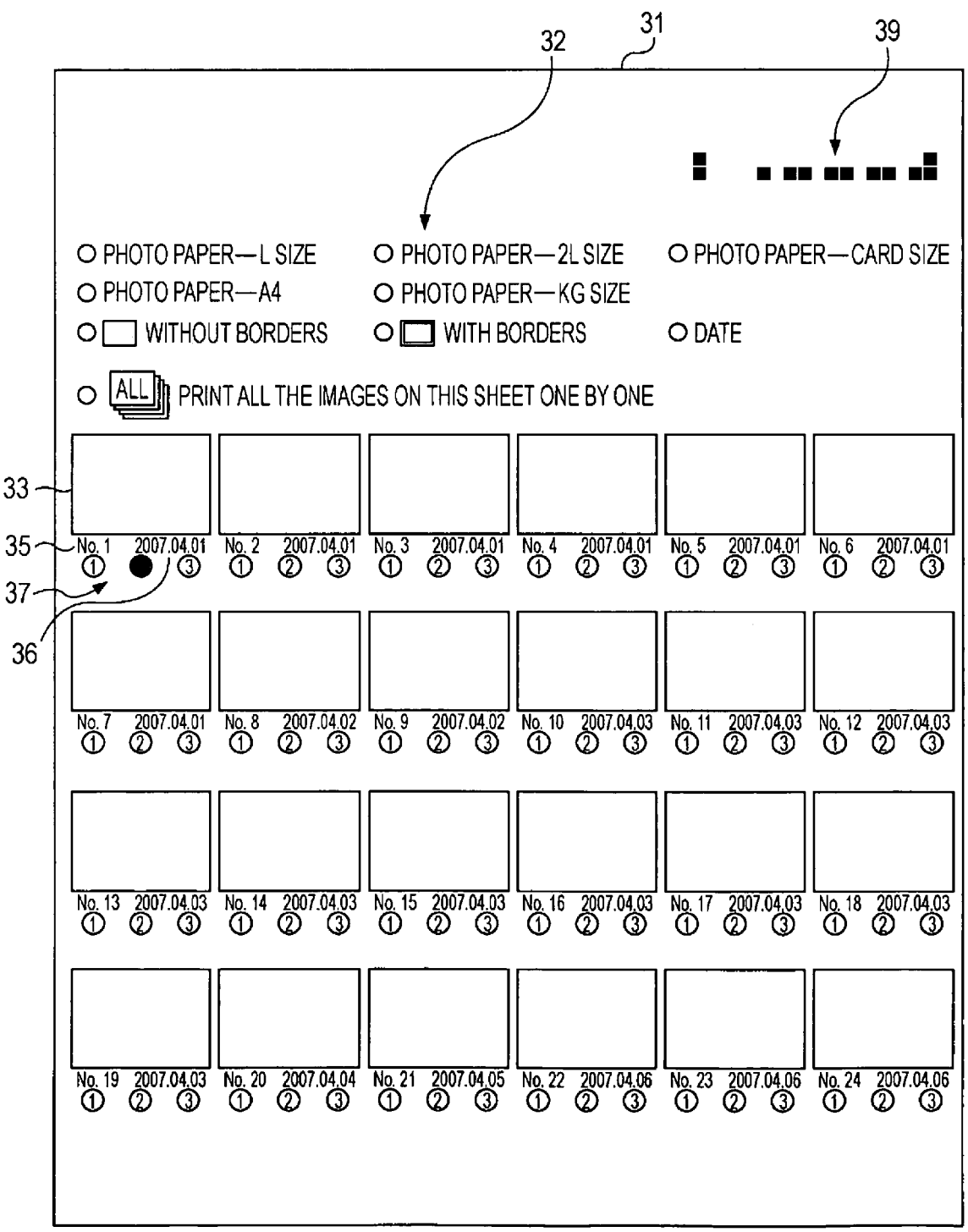
FIG. 2 is an illustration of an order sheet that is set in the digital multifunction machine shown in FIG. 1.

FIG. 2 is an illustration showing an example of an order sheet 31 that is read by the digital multifunction machine 1 shown in FIG. 1. The configuration of the order sheet 31 shown in FIG. 2 will be described with reference to the digital multifunction machine 1 shown in FIG. 1.

The order sheet 31 is, for example, A4 size paper. On the order sheet 31, a plurality of images 33 are printed so as to be arranged in an index form. The images 33 printed on one order sheet 31 are reduced images of all or some images among a plurality of images stored in the medium 3. In other words, a large amount of image data is recorded in the medium 3. When all the image data can be printed, all the images are printed on one order sheet 31. When all the image data cannot be printed, all the images are printed on a plurality of order sheets 31. In the following description, when the images are printed on the plurality of order sheets 31, the plurality of order sheets 31 is called "a set of order sheets 31".

In addition, in the vicinity of a lower left corner of each of images 33 printed on one order sheet 31, each image number 35 is printed. In the example shown in FIG. 2, the image numbers 35, such as No. 1, No. 2, No. 3, etc., are consecutively assigned in order from the image 33 at the top left position to a right direction. Similarly, in lower rows of the images 33, the image numbers 35 are consecutively assigned in order.

In addition, a plurality of circular or elliptic shapes are printed in a mark sheet form below each image 33, forming each number-of-copies selecting field 37. In the number-of-copies selecting field 37, by blacking out a circular or elliptic shape in which, for example, the numeral 1, 2, or 3 is printed, a corresponding number of copies to be printed can be selected. For example, in the case of FIG. 2, for the image 33 having No. 1, a shape representing two copies is blacked out, whereby the number of copies to be printed is selected to be two. In a case where any image 33 is not printed, instead of blacking out any shape in a corresponding number-of-copies selecting field 37, the number of copies to be printed is not selected.

Instead of specifying the number of copies to be printed, it is possible to provide a shape for only selecting whether printing is to be performed. In this case, when the shape for selecting whether printing is to be performed is blacked out, the digital multifunction machine 1 regards this status as a print request in which the number of copies to be printed is selected to be one.

In addition, in a top right portion of each order sheet 31, a check code 39 indicated by, for example, a two-dimensional barcode is printed. In the check code 39, a sheet identification (ID) representing identification information of the order sheet 31 and a first image number of the order sheet 31 are recorded. The sheet ID corresponds to a media ID of the medium 3 in which image data to be printed on the order sheet 31 is recorded. As the first image number, the image number 35 of the image 33 (in the case of FIG. 2, the image 33 having No. 1), which is positioned at the beginning of each order sheet 31, is recorded. Therefore, even if the order sheets 31 are set at random in the scanner unit 13, by analyzing the check code 39 of each order sheet 31, the order sheet 31 can be uniquely identified.

The media ID may be identification information fixed to each medium, and may vary depending on stored information.

The order sheet 31 has, below the check code 39, a paper type selecting field 32 for collectively selecting a type of printing paper, a print form, and the number of copies to be printed. In the example shown in FIG. 2, in the top row of the paper type selecting field 32, "L SIZE" (127×89 mm), "2L SIZE" (178×127 mm), and "CARD SIZE" are shown, and, in the following row, "A4" and "KG SIZE" are shown. By blacking out a shape shown beside a desired printing paper size, a user can select the type of printing paper.

In the following row, representations for selecting a print form, and a representation of selecting whether to print a date are printed. In other words, regarding the print form, one of settings "WITHOUT BORDERS" and "WITH BORDERS" can be selected by blacking out a corresponding shape. In addition, in the case of printing of a shooting date and time in a portion of printing paper, the printing of the shooting date and time can be selected by blacking out a shape shown on the right side.

In the following row, a shape that is blacked out when all the images printed on the order sheet 31 are to be printed one by one is printed.

B. Overview of Operation of Embodiment

Next, an overview of operation of the embodiment of the invention will be described below. Regarding the digital multifunction machine 1 according to the embodiment, the order sheets 31 as shown in FIG. 2 are distributed to a plurality of users. After each user blacks out shapes corresponding to necessary images, the order sheets 31 are collected. The order sheets 31 are collectively read by the ADF unit 15, and printing is executed.

In such a case, it is assumed that each user selects a different type of printing paper. One example is that user A selects the L size, user B selects the 2L size, user C selects the L size, and user D selects the 2L size. This case is cumbersome since it is necessary to change types of printing paper for each user.

Accordingly, in the digital multifunction machine 1 according to the embodiment, printing of a group of images having the same type of printing paper selected by the order sheets 31 is executed in a batch manner as one job. After one job (that is, printing on the same type of printing paper) finishes, printing of a group of images having a different type of printing paper is executed. In the above example, printing of a group of images having the L size selected by users A and C is executed in a batch manner as one job. In addition, printing of a group of images having the 2L size selected by users B and C is executed in a batch manner as one job. This makes it possible to continuously perform printing only by changing L-size printing paper to 2L-size printing paper once.

At this time, when one job is started, the display unit 16 displays information representing the type of printing paper that is used in the job to be executed. By referring to this information, the user can set an appropriate type of printing paper in the printer unit 11.

As described above, in the digital multifunction machine 1 according to the embodiment, in a case where the order sheets 31 on which different types of printing paper are selected are read by the ADF unit 15, a group of images for which each identical type of printing paper is selected is treated as one job, and printing is executed in units of jobs. Thus, the time and effort required to change types of printing paper can be reduced.

In addition, when one job is executed, the display unit 16 displays information representing a type of printing paper to be printed. Thus, by referring to the information, the user can select and set the printing paper without fail.

C. Details of Operation of Embodiment

Next, a detailed operation of the embodiment of the invention will be described below. The following describes, as an example, a case where, after order sheets 31 printed by a main user are distributed to subusers and the subusers fill in the order sheets 31, the order sheets 31 are collected and collectively read by the ADF unit 15 and printing is executed.

First, the main user, who is a user (such as a travel organizer) performs printing in a batch manner, inserts the medium 3, such as a memory card storing image data of photographs or the like, into a card slot (in the example shown in FIG. 1, a loading slot) of the digital multifunction machine 1, and instructs the digital multifunction machine 1 to print a necessary number (corresponding to the number of the subusers) of order sheets 31.

Then, thumbnails in the memory card (the medium 3) are sequentially read by the reader/writer 5, and a list of images (that is, the images 33) is printed on A4 paper by the printer unit 11, with the images arranged in an index form. At this time, in a case where all the images in the memory card cannot be printed as a list of images on a sheet of A4 paper, they are printed as a list of images on a plurality of sheets. This processing is repeated a number of times corresponding to a specified number of sheets (the number of users).

In addition, for each image 33, the image number 35, the shooting date and time 36, and the number-of-copies selecting field 37 are printed at positions corresponding to the image 33. Furthermore, in the top right corner of the A4 paper, the check code 39 in which the sheet ID and the first image number are recorded is printed. At this time, when the images 33 corresponding to all the thumbnails recorded in one memory card are printed on a plurality of sheets of paper, On the plurality of sheets of paper, that is, the set of order sheets 31, the same sheet ID is recorded, and each first image number is printed so as to match the image number 35 of an image printed at the beginning of each sheet. The paper type selecting field 32 is printed below the check code 39. This processing is repeated a number of times corresponding to the number of subusers, who are users (for example, participants on a travel) asking the main user to print photographs. This creates the number of (the number of sets of) order sheets 31 that corresponds to the number of subusers.

Next, the main user distributes the order sheets 31 created as described above to the subusers. When one subuser receives the distributed order sheet 31, the subuser uses a pencil or ball-point pen to black out a shape corresponding to the number of copies to be printed in a number-of-copies selecting field 37 corresponding to each desired image 33 to be printed. Also, the subuser selects a type of printing paper to be printed, a form with/without borders, and insertion or no insertion of a date in a paper type selecting field 32. Further, the subuser can select printing of all images printed on the order sheet 31 one by one by blacking out a shape printed at the bottom of the paper type selecting field 32.

The main user collects the order sheets 31 filled in by the subusers. Subsequently, the main user collectively sets the collected order sheets 31 in the ADF unit 15.

Next, the flow of a process in which the digital multifunction machine 1 according to the embodiment collectively reads the order sheets 31 and performs printing will be described with reference to the flowchart shown in FIG. 3.

Figure 3:
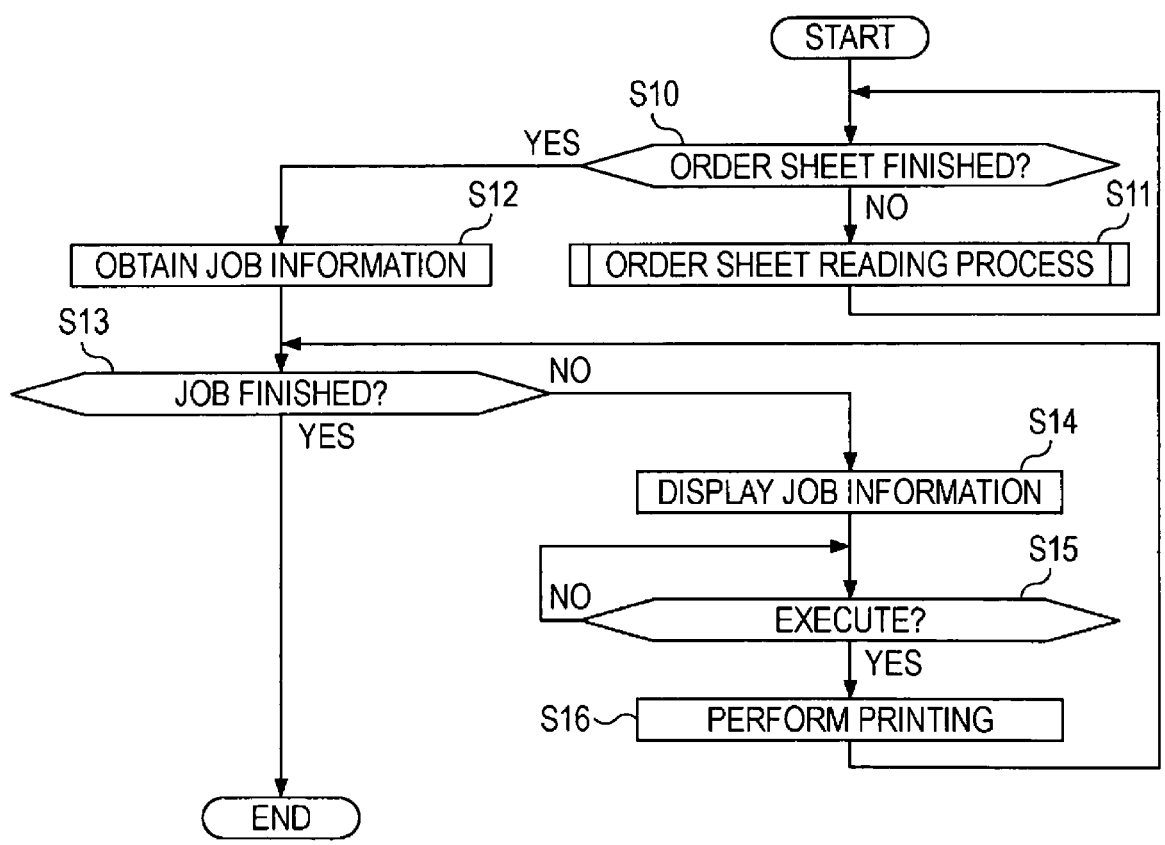
FIG. 3 is a flowchart showing a first embodiment of the invention in which batch printing is performed on the basis of a plurality of order sheets.

FIG. 3 is a flowchart showing the flow of a process in which the digital multifunction machine 1 according to the embodiment collectively reads the order sheets 31 and performs printing. This process is started when the main user performs a printing-start operation on the input unit 18 in a state in which, as described above, the collected order sheets 31 are set in the ADF unit 15. When the process in the flowchart is started, the following steps are executed.

In step S10, the processor 17 determines whether reading of all the order sheets 31 has finished. If the reading has finished, the processor 17 proceeds to step S12. If not, the processor 17 proceeds to step S11. Specifically, the processor 17 controls the scanner unit 13 to capture the order sheets 31 one by one by sending a control signal to the ADF unit 15. At this time, when the ADF unit 15 or the scanner unit 13 supplies the processor 17 with a signal representing a paper end, the processor 17 determines that the order sheets 31 have finished and proceeds to step S12. If the signal is not supplied, the processor 17 proceeds to step S11.

In step S11, the processor 17 executes reading of one order sheet 31. In other words, the processor 17 controls the scanner unit 13 to read, as image data, information described in one order sheet 31 captured by the ADF unit 15, and to read information filled in by one subuser. Details of this processing will be described later with reference to FIG. 4. The information (such as a type of printing paper, the number of copies of each image to be printed, and printing conditions) read from the order sheet 31 in step S11 is stored as "job information" in, for example, the RAM 21, and is used in step S14 and the subsequent steps.

The job information is printing information concerning a group of images in which the same type (such as the L size, the 2L size, the card size, A4, or the KG size) of printing paper is to be printed. As shown in FIG. 4, the information read from each order sheet 31 is formed of information representing the number of frames of images to be printed, the number of copies to be printed, a form with/without borders, and insertion or no insertion of a date. Specifically, information read from sheet #1 (a set of order sheets 31 filled in by subuser #1) indicates that the image in the first frame is to be printed with two copies, without borders, and with insertion of a date. Also from sheets #2 to #5, information is similarly read.

In the embodiment, as shown in FIG. 5, pieces of the information read from the order sheets 31 are classified by type of printing paper, and each classified piece of information is treated as a job. Specifically, printing for a group of images for which printing paper of the L size is to be printed is classified into job J1. Printing for a group of images for which printing paper of the A4 size is to be printed is classified into job J2. Printing for a group of images for which printing paper of the L2 size is to be printed is classified into job J3.

In step S12, the processor 17 obtains the job information (see FIG. 5) generated in step 11 and stored in the RAM 21.

In step S13, the processor 17 determines whether printing has finished for all the jobs. If it is determined that printing has not finished, the processor 17 proceeds to step S14. Alternatively, the processor 17 finishes the process.

Figure 6:
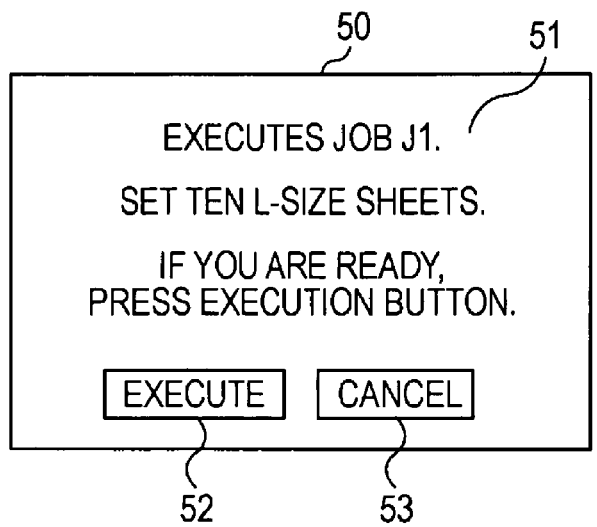
FIG. 6 is an illustration of an example of information in a case where a job is started.

In step S14, the processor 17 displays, on the display unit 16, information of a job to be executed, and enters a state that awaits a user's instruction. Specifically, the information shown in FIG. 6 is displayed on the display unit 16. In this example, a display section 50 of the display unit 16 displays a message 51 "EXECUTES JOB J1. SET TEN L-SIZE SHEETS. IF YOU ARE READY, PRESS EXECUTION BUTTON". Below the message 51, an execution button 52 and a cancellation button 53 are displayed as a graphical user interface (GUI).

Display of the above information is realized by acquiring, from the job information shown in FIG. 5, a job name (in this example, "JOB J1"), a paper size (in this example, "L SIZE"), and the total of the numbers of copies to be printed (in this example, the total of 5 copies, 1 copy, 1 copy, 1 copy, 1 copy, and 1 copy), combining these pieces of information with the other characters of the message 51, and supplying the obtained message to the display unit 16.

In step S15, the processor 17 determines whether the execution button 52 shown in FIG. 6 or a predetermined button of the input unit 18 has been operated. If either button has been operated, the processor 17 proceeds to step S16. If not, the same processing is repeated. In other words, the processor 17 enters a state that awaits an input. If the cancellation button 53 shown in FIG. 6 has been operated, the processor 17 may proceed to step S13 without executing printing in step S16.

More specifically, after the main user sets the type of printing paper displayed on the screen shown in FIG. 6 in the printer unit 11, when the main user operates the execution button 52 or the predetermined button, the processor 17 proceeds to step S16.

In step S16, the display unit 16 executes printing corresponding to a job to be processed. Specifically, the processor 17 acquires, from the job information shown in FIG. 5, pieces of information concerning the number of frames for images to be printed, a form with/without borders, and insertion or no insertion of a date, and executes printing on the basis of the pieces of information. More specifically, for the 1st frame in job J1, the processor 17 acquires targeted image data from the medium 3 via the reader/writer 5. In other words, the processor 17 reads image data corresponding to the 1st frame in predetermined data units (for example, an amount corresponding to a buffer area included in the RAM 21), and stores the read image data in the RAM 21. Subsequently, the processor 17 performs decoding (for example, JPEG (Joint Photographic Experts Group) decoding) on the read image data. The processor 17 executes processing, such as decimation or interpolation, on the image data in accordance with the size of printing paper, and fine adjusts the size in accordance with a form with/without borders. In addition, the processor 17 acquires shooting-date information from header information of the image data in accordance with whether a date is to be inserted, and superposes the shooting-date information on the obtained image data. After that, after the processor 17 performs micro-weaving or the like, the processor 17 supplies the image data to the printer unit 11 in units (for example, an amount of data that can be printed with a print head (not shown)) of processing, and controls the printer unit 11 to perform printing. As a result, for job J1, the images in the 1st to 5th frames are sequentially printed in units of frames on L-size printing paper, with the set number of copies. After printing for each job finishes, the processor 17 proceeds to step S13. If, in step S13, printing for all the jobs has not been completed, the processor 17 proceeds to step S14 and repeats the same processing. In the above-described processing, on the basis of the job information shown in FIG. 5, image data is printed on selected types of printing paper.

In the above-described processing, the order sheets 31 filled in by the subusers are scanned and analyzed, and the obtained information is classified by type of printing paper to generate jobs. In units of the jobs, printing can be executed.

In addition, when a job is started, a type of printing paper and a necessary number of sheets of the printing paper are displayed on the display unit 16.

Figure 7:
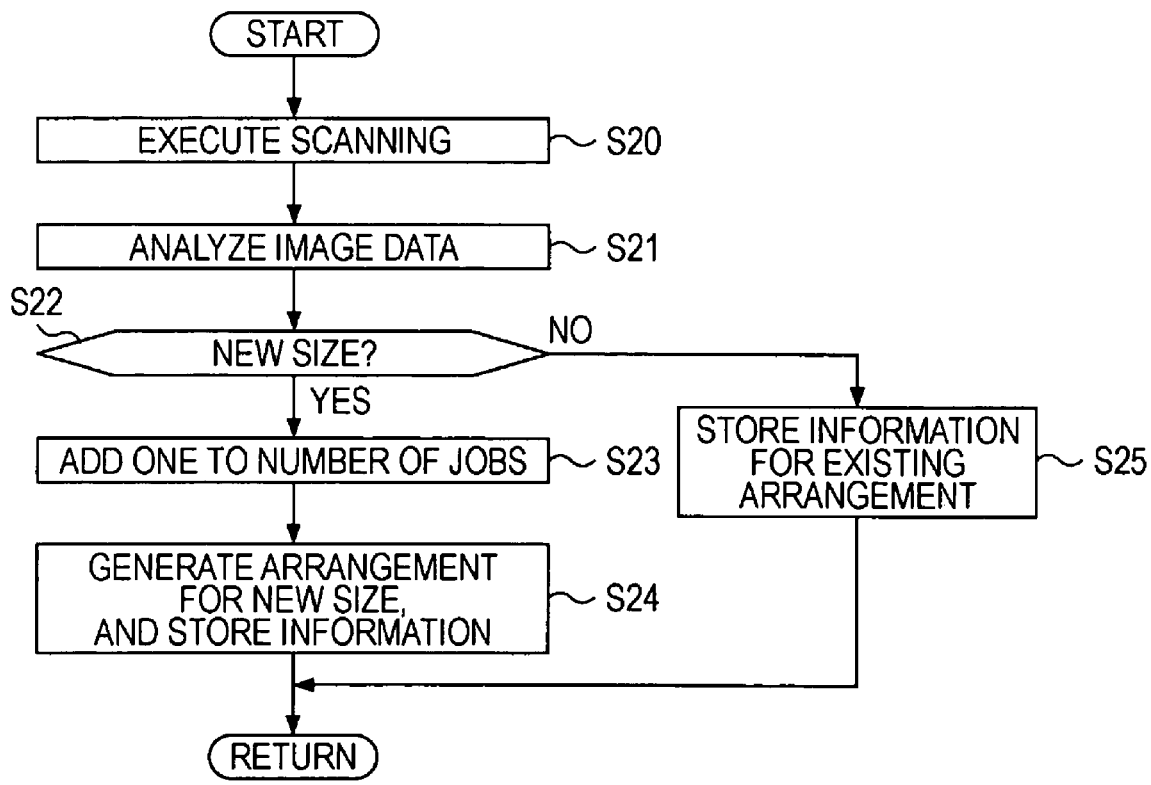
FIG. 7 is a detailed flowchart showing step S11 shown in FIG. 3.

Next, details of the "order sheet reading process" in step S11 shown in FIG. 3 will be described below with reference to FIG. 7. After the process in the flowchart shown in FIG. 7 is started, the following steps are executed.

In step S20, the processor 17 supplies a control signal and controls the scanner unit 13 to execute scanning. As a result, the scanner unit 13 converts information described in one order sheet 31 captured by the ADF unit 15 into image data and reads the image data.

In step S21, the processor 17 analyzes the image data obtained in step S20. Specifically, by analyzing the check code 39, the processor 17 specifies the ID of the medium 3 and a first image number. In addition, by analyzing whether each shape has been blacked out in the paper type selecting field 32, the processor 17 acquires information concerning a type of printing paper, a form with/without borders, insertion or no insertion of a date, and a setting of whether all the images are to be printed one by one. Furthermore, by analyzing the number-of-copies selecting field 37 shown below each image 33 shown in an index form, the processor 17 acquires the number of copies (to be printed) of each image.

In step S22, by referring to information obtained as the result of the analyses in step S21, the processor 17 determines whether the size of printing paper to be printed is a new size (a size that has not been used yet). If the size of printing paper is a new size, the processor 17 proceeds to step S23. If not, the processor 17 proceeds to step S25. Specifically, for example, in the case of reading concerning sheet #1, as shown in FIG. 4, the L size is selected as the size of printing paper, and, at that point in time, the L size is initially selected. Thus, in step S22, it is affirmatively determined, and the processor 17 proceeds to step S23. In the following case of reading concerning sheet #2, as shown in FIG. 4, the L size is selected as the size of printing paper, and this is identical to that for sheet #1. Thus, in step S22, it is negatively determined, and the processor 17 proceeds to step S25. Subsequently, for sheet #3, the A4 size is selected. Thus, in step S22, it is affirmatively determined, and the processor 17 proceeds to step S23. For sheet #4, the L size is selected. Thus, in step S22, it is negatively determined, and the processor 17 proceeds to step S25. For sheet #5, the 2L size is selected. Thus, in step S22, it is affirmatively determined, and the processor 17 proceeds to step S23.

In step S23, the processor 17 adds one to the total number of jobs. For example, when sheet #1 is read, the number of jobs changes from "0" to "1". When sheet #3 is read, the number of jobs changes from "1" to "2". In other words, whenever a new type of printing paper is selected, the number of jobs increases.

In step S24, the processor 17 generates a new arrangement for the new size and stores its information. In other words, the processor 17 generates one "job" shown in FIG. 5, and stores read information in association with the job. Specifically, when sheet #3 shown in FIG. 4 is read, the A4 size is selected as the size of printing paper. Accordingly, job J2 shown in FIG. 5 is generated. The "4th frame" is stored as an image to be printed, "3 copies" are stored as the number of copies to be printed, and settings "with borders" and "no insertion of a date" are stored. After that, the processor 17 returns to the process shown in FIG. 3.

In step S25, the processor 17 stores information for an existing arrangement, and returns to the process in FIG. 3. Specifically, processing concerning sheet #2 has settings "1 copy of the 2nd frame", "with borders", and "insertion of a date". Accordingly, printing information (the information in the second row from top in FIG. 5) is added. At this time, in a case where, in information to be newly added, the number of frames, a form with/without borders, and insertion or no insertion of a date are identical to those in existing information, the number of copies to be printed (in the information to be newly added) is accumulatively added to the number of copies to be printed in the existing information. Specifically, since information in the first row of the sheet #4 section (FIG. 4) that represents "1st frame, a form without borders, and insertion of a date" is identical to information of the 1st frame in the sheet #1 section (FIG. 4) that represents "1st frame, a form without borders, and insertion of a date". Thus, "2" as the number of copies to be printed in sheet #1 is accumulatively added to "3" as the number of copies to be printed for the 1st frame in sheet #4, whereby, in job J1, the number of copies to be printed changes to 5 as shown in "1st frame: 5 copies" (FIG. 5).

According to the foregoing processing, the order sheets 31 filled in by the subusers are read and classified by type of printing paper, whereby the job information shown in FIG. 5 can be generated.

As described above, according to the embodiment of the invention, the main user collects the order sheets 31 filled in by the subusers, sets the order sheets 31 in the ADF unit 15, and starts reading of the order sheets 31, whereby images selected on the order sheets 31 are classified in units of frames (to be printed) by type of printing paper (to be printed) to generate the job information shown in FIG. 5.

The digital multifunction machine 1 executes printing on the basis of the job information shown in FIG. 5. This enables the main user to reduce the time and effort required to frequently change types of printing paper.

In addition, in a case where, when one job is switched to another, types of printing paper need to be changed, as shown in FIG. 6, the type of printing paper is displayed on the display unit 16. Thus, it is ensured that the main user can know an appropriate type of printing paper.

Since printing is not executed unless the execution button 52 on the screen shown in FIG. 6 is operated, the printing is not executed until an appropriate type of printing paper is set. Therefore, the printing can be prevented from being executed before types of printing paper are changed.

As shown in FIG. 5, each piece of job information is classified on the basis of the setting "with/without borders" and the setting "insertion or no insertion of a date". Therefore, for example, by caching image data generated by microweaving in the RAM 21, processing on the same image, such as image data decoding, enlargement and reduction, microweaving, and date-information superposition, can be prevented from being repeatedly executed, thus accelerating the printing.

D. Modifications

The foregoing embodiment is an exemplary embodiment. In addition, there are various modifications of the foregoing embodiment. Although the foregoing embodiment has been described using, for example, a size of printing paper as a type of printing paper, for example, job determination may be performed considering, for example, surface types (for example, photographic paper, glossy paper, plain paper, etc.) of printing paper. Specifically, in a case where A4 photographic paper is selected for one order sheet 31, and in a case where A4 plain paper is selected for another order sheet 31, these cases are classified as different jobs. This is because it is necessary to change the types of printing paper. When it is necessary to change the types of printing paper, as in the above example, display of job information on the display unit 16 enables the user to set an appropriate type of printing paper.

In addition, in the foregoing embodiment, it is assumed that only one type of printing paper can be set in the printer unit 11. However, when plural types of printing paper can be simultaneously set in the printer unit 11, cases using plural types of printing paper that can be set may be collectively treated as one job. Specifically, in a case where L-size paper and A4 paper can be simultaneously set in the printer unit 11, groups of images for which these types of printing paper are to be printed can be integrated as the same job. This is because printing can be executed without changing the types of printing paper.

Although the foregoing embodiment describes, as an example, a case where one copy of an image is printed on one sheet of printing paper, for example, plural copies of an image can be printed on one sheet of printing paper. FIG. 8 shows an example of job information including printing (so-called "N-UP printing") of six images in the 1st to 6th frames on A4 paper. In this example, information in the second row in job J2 section represents printing of six images in the 1st to 6th frames on A4 paper. At the beginning of the information, information (N-UP) representing N-UP printing is stored and information (1st to 6th frames) representing the number of frames for images to be printed is stored. By using the above job information, so-called N-UP printing can be performed.

In addition, although, in the foregoing embodiment, only one type of printing paper can be selected for one set of order sheets 31 (order sheets 31 distributed to the users), different types of printing paper may be selected in units of images. Specifically, setting is such that the A4 size is selected for the 1st frame, the L size is selected for the 2nd frame, and so on. In such a case, the printing paper classification process shown in FIG. 7 is executed not in units of order sheets 31, but in units of images.

In the foregoing embodiment, a correction process on image data is not considered. However, for example, by using the order sheet 31 shown in FIG. 2, the correction process may be specified in units of sets of order sheets 31 or in units of images. Specifically, regarding a method for specifying the correction process in units of sets of order sheets 31, in the paper type selecting field 32 of the order sheet 31 shown in FIG. 2, correction types (for example, correction based on face recognition, red-eye reduction, contrast correction, and brightness correction) and their details (such as an intensity of each correction) are configured to be set. When the above correction types are selected, information concerning the selected correction may be added to the job information shown in FIG. 5. In that case, when the settings "with/without borders", "insertion or no insertion of a date", types and details of correction are identical between both, accumulative addition to the number of copies to be printed may be performed.

In the foregoing embodiment, printing is sequentially executed in units of jobs and printed sheets of printing paper are output in the order. However, in a case where the printer unit 11 includes a sorter for sorting sheets of printing paper in a predetermined order, the sheets of printing paper may be sorted and output in units of the subusers. Specifically, information that specifies one order sheet 31, or information that identifies a user is added to the job information shown in FIG. 5. On the basis of the resulting information, sorting may be performed by the sorter for each order sheet 31 or for each user. According to such a modification, it is not necessary to change types of printing paper and it is not necessary to sort sheets of printing paper in units of the subusers after printing.

In addition, in a case where the sorter does not exist, when printing is executed, the information that specifies one order sheet 31, or the information that identifies one user may be displayed on the display unit 16, and, on the basis of the displayed information, the user may sort sheets of printing paper by performing a manual operation.

The above processing functions can be realized by a computer. In this case, a program that describes processing details of functions to be possessed by the digital multifunction machine 1 is provided. By executing the program on the computer, the above processing functions can be realized on the computer. The program that describes the processing details of functions can be recorded in computer-readable recording media. The computer-readable recording media include magnetic recording devices, optical discs, magneto-optical recording media, and semiconductor memories. The magnetic recording devices include a hard disk drive (HDD), a flexible disk (FD), and a magnetic tape. The optical discs include a digital versatile disc (DVD), a DVD-RAM, a compact-disc read-only memory (CD-ROM), a CD recordable (CD-R), and a CD rewritable (CD-RW). The magneto-optical recording media include a magneto-optical disc (MO).

In a case where the program is distributed, for example, portable recording media having the program recorded therein, such as DVDs and CD-ROMs, are sold. Also, by storing the program in a storage device of a server computer, the program can be transferred from the server computer to other computers via a network.

A computer that executes the program stores, in its storage device, for example, the program recorded in the portable recording medium or the program transferred from the server computer. The computer reads the program from its storage device and executes processing in accordance with the program. Also, the computer can directly read the program from the portable recording medium and can execute processing in accordance with the read program. In addition, whenever the program is transferred from the server computer and is received, the computer can execute processing in accordance with the received program.

What is claimed is:

1. A printing system comprising:
   an optical sensor that reads a plurality of order sheets at least selecting images to be printed and printing sheet types;
   a printing specifying unit that specifies the images and printing sheet types selected by the order sheets on the basis of an output from the optical sensor;
   a reader that reads image data of the images selected by the order sheets from a recording medium; and
   a printer that prints the read image data on types of printing paper which correspond to the printing sheet types selected by the order sheets,
   wherein, after the optical sensor reads the order sheets, the printer performs batch printing based on the images and printing sheet types selected by all the order sheets.

2. The printing system according to claim 1, wherein, in a case where the images selected by the order sheets include identical images to be printed, the printer consecutively prints the identical images.

3. The printing system according to claim 1, wherein, in a case where the images selected by the order sheets include images to be printed on the same type of printing paper, the printer consecutively prints the images on the same type of printing paper.

4. The printing system according to claim 2, further comprising a display unit that displays information representing a type of printing paper when the printer initiates consecutive printing.

5. The printing system according to claim 1, further comprising a feeder that feeds the order sheets,
wherein the feeder sequentially feeds the order sheets to the optical sensor.

6. An order-sheet-based batch printing method comprising:
reading a plurality of order sheets at least selecting images to be printed and printing sheet types by an optical sensor;
specifying the images and printing sheet types selected by the order sheets on the basis of an output from the optical sensor;
reading image data of the images selected by the order sheets from a recording medium; and
on the basis of the read image data, performing batch printing based on the images and printing sheet types selected by all the read order sheets.

7. The order-sheet-based batch printing method according to claim 6, wherein, in a case where the images selected by the order sheets include identical images to be printed, the performing batch printing includes consecutive printing of the identical images.

8. The printing system according to claim 1, wherein the plurality of order sheets include order sheets from a plurality of subusers each selecting the images to be printed from among a same index of available images for printing.

9. The printing system according to claim 1, wherein each of the plurality of order sheets includes a sheet identification that uniquely identifies a medium storing images on the order sheet that can be selected to be printed, and
the output from the optical sensor includes the sheet identifications of the order sheets.

10. The printing system according to claim 1, wherein the plurality of order sheets comprises a plurality of paper sheets.

11. The order-sheet-based batch printing method according to claim 6, wherein the plurality of order sheets include order sheets from a plurality of subusers each selecting the images to be printed from among a same index of available images for printing.

12. The order-sheet-based batch printing method according to claim 6, wherein each of the plurality of order sheets includes a sheet identification that uniquely identifies a medium storing images on the order sheet that can be selected to be printed, and
the output from the optical sensor includes the sheet identifications of the order sheets.

13. The order-sheet-based batch printing method according to claim 6, wherein the plurality of order sheets comprises a plurality of paper sheets.

* * * * *